United States Patent [19]

Bryant et al.

[11] Patent Number: 4,756,958

[45] Date of Patent: Jul. 12, 1988

[54] FIBER WITH REVERSIBLE ENHANCED THERMAL STORAGE PROPERTIES AND FABRICS MADE THEREFROM

[75] Inventors: Yvonne G. Bryant; David P. Colvin, both of Raleigh, N.C.

[73] Assignee: Triangle Research and Development Corporation, Raleigh, N.C.

[21] Appl. No.: 91,550

[22] Filed: Aug. 31, 1987

[51] Int. Cl.$^4$ .................. B32B 3/10; D02G 8/04
[52] U.S. Cl. .................. 428/320.2; 428/321.5; 428/332; 428/336; 428/372; 428/401; 428/913; 428/920
[58] Field of Search .................. 428/320.2, 321.5, 372, 428/913, 920, 332, 336, 401

[56] References Cited

U.S. PATENT DOCUMENTS

| | | | |
|---|---|---|---|
| 2,694,606 | 11/1954 | Etzkorn | 428/372 |
| 3,493,460 | 2/1970 | Windecker . | |
| 3,852,401 | 12/1974 | Suzuki et al. . | |
| 4,048,359 | 9/1977 | Shibani et al. | 428/331.5 |
| 4,226,906 | 10/1980 | Jacob . | |
| 4,230,808 | 10/1980 | Pietersen . | |
| 4,273,825 | 6/1981 | Nishiyama et al. . | |
| 4,296,174 | 10/1981 | Hanzel et al. | 428/372 |
| 4,428,998 | 1/1984 | Hawkinson . | |
| 4,441,508 | 4/1984 | Buirley et al. | 428/321.5 |
| 4,470,917 | 9/1984 | Hawe et al. . | |
| 4,513,106 | 4/1985 | Edgren et al. . | |
| 4,514,461 | 4/1985 | Woo . | |
| 4,528,226 | 7/1985 | Sweeny . | |
| 4,561,981 | 12/1985 | Characklis . | |
| 4,572,864 | 2/1986 | Benson et al. | 428/320.2 |
| 4,605,586 | 8/1986 | Lane . | |
| 4,609,587 | 9/1986 | Giordano et al. . | |
| 4,623,583 | 11/1986 | Mischutin . | |
| 4,659,619 | 4/1987 | Tate | 428/321.5 |
| 4,675,161 | 6/1987 | Hashimoto et al. | 428/321.5 |
| 4,681,791 | 7/1987 | Shibakashi et al. | 428/372 |

FOREIGN PATENT DOCUMENTS

| | | | |
|---|---|---|---|
| 964542 | 2/1950 | France | 428/373 |
| 03510 | 3/1965 | Netherlands | 428/372 |

*Primary Examiner*—James C. Cannon
*Attorney, Agent, or Firm*—Robert G. Rosenthal

[57] ABSTRACT

A fiber with integral microspheres filled with phase change material or plastic crystals has enhanced thermal properties at predetermined temperatures. The fibers may be woven to form a fabric having the enhanced thermal storage properties and articles of manufacture may be formed therefrom.

15 Claims, No Drawings

4,756,958

FIBER WITH REVERSIBLE ENHANCED THERMAL STORAGE PROPERTIES AND FABRICS MADE THEREFROM

This invention was made with Government support under contract No. F33657-87-C-2138 awarded by the United States Air Force. The Government has certain rights in this invention.

FIELD OF THE INVENTION

This invention relates generally to the field of synthetic fibers impregnated with microcapsules and more particularly to fibers containing leak resistant microcapsules which are filled with energy absorbing phase change material or a plastic crystal material which enables articles of manufacture made therefrom to exhibit extended or enhanced heat retention or storage properties.

BACKGROUND OF THE INVENTION

The treatment of textiles and/or fibers with various substances in order to change the properties thereof is well known. For example, it is known that textiles may be waterproofed by coating them with natural or synthetic rubber. Substances have been developed which when sprayed onto fabrics introduce the property of stain resistance. In addition, it is known that fragrance delivery systems can be incorporated into fabrics. One such fragrance delivery system uses breakable fragrance filled microcapsules which are attached to the surface of a fabric or fiber and upon the introduction of an external force, the microcapsules break releasing the fragrance over an extended time period.

Fabrics have been given enhanced thermal properties by coating the fibers and the interstitial spaces between fibers with phase change materials and with plastic crystals (see Fabrics given enhanced thermal properties, Oct. 20, 1986; Chemical and Engineering News, Pages 15 and 16). The thermal properties of fabric are enhanced as it is impregnated with these microcapsules. More specifically, materials such as water, undergo phase changes from solid to liquid to gas at well known temperatures. Similarly, other materials such as paraffin wax undergo phase change from a solid to a liquid (fusion). At the phase change temperature, a characteristic of the material during the heating cycle is to absorb and hold a large quantity of thermal energy at a constant temperature before changing to the next phase. Thus, the material can be used as an absorber to protect an object from additional heat as a quantity of thermal energy will be absorbed by the phase change material before its temperature can rise. The phase change material may also be preheated and used as a barrier to cold, as a larger quantity of heat must be removed from the phase change material before its temperature can begin to drop.

However, the aforementioned surface mounted phase change materials are not without their deficiencies. For example, it was found that while somewhat effective, the phase change material was not durably bound to the fibers and laundering removed most of the material. Thus, the fabric lacked repeatability of thermal response as each laundering removed a portion of the phase change material, thus causing the fabric to exhibit a corresponding change in thermal properties which limited its usefulness. As a result, further work was undertaken to perfect a series of process steps for binding the phase change material to the fabric in order to extend the useful life of the enhanced thermal properties. Furthermore, as far as is known to the inventors, the usefulness of these fibers and fabrics has been applied to a broader temperature range which limits the thermal absorption or release at a specific temperature range.

It is, therefore, an object of the present invention to provide a fiber with enhanced thermal retention properties.

It is another object of the present invention to provide a fiber which will maintain its enhanced thermal properties over an extended period of time.

It is a further object of the invention to provide a fiber having enhanced thermal properties which can be produced with a minimum of process steps.

It is a still further object of the invention to provide a fiber having enhanced thermal properties which can be woven into a fabric from which articles of clothing and the like can be manufactured.

It is a still further object of the present invention to provide a fiber which displays enhanced thermal properties over a specified temperature range.

SUMMARY OF THE INVENTION

The foregoing objects are accomplished by providing a fiber with reversible thermal storage properties comprising a base material and a plurality of microcapsules. The microcapsules are integral with and are dispersed throughout the base material and contain a temperature stabilizing means such as a phase change material or plastic crystals. The fiber exhibits enhanced thermal stability when subjected to heat or cold. The microcapsules are resistant to leakage or rupture and may be subjected to repeated external mechanical stresses with minimum changes in the thermal characteristics of the fiber. Additionally, the fiber may also include microcapsules containing different preselected phase change materials which increase the range of temperature stability of the fiber. The fiber may also be woven into a temperature adaptable fabric.

DETAILED DESCRIPTION OF THE PREFERRED EMBODIMENTS

While the present invention will be described more fully hereinafter, it is to be understood at the outset that persons of skill in the art may modify the invention herein described while still achieving the favorable results of this invention. Accordingly, the description which follows is to be understood as being a broad teaching disclosure directed to persons of skill in the appropriate arts, and not as limiting upon the present invention.

The fiber with reversible thermal storage properties comprises a base material and a plurality of microcapsules dispersed throughout the base material. The base material is preferably a synthetic polymer such as polyester, nylon, acrylic or modacrylic and the like.

The microcapsules can range in size from about one to about 10 microns and are formed according to the methods described in any one of the following texts to which the reader is referred for an explanation on how to fabricate microcapsules:

Books on Microencapsulation:
1. Vandergaer, J. E., Ed: Microencapsulation: Processes and Applications. Plenum Press, New York, 1974.

2. Gutcho, M. H.: Microcapsules and Microencapsulation Techniques. Noyes Data Corp., Park Ridge, N.J., 1976.
3. Ranney, M. W.: Microencapsulation Technology, Noyes Development Corp., Park Ridge, N.J., 1969.
4. Kondo, A.: Microcapsule Processing and Technology. Marcel Dekker, Inc., New York, 1979.
5. Nixon, J. R.: Microencapsulation. Marcel Dekker, Inc., New York, 1976.

Articles on Microencapsulation:
1. Sparks, R. E.: "Microencapsulation", Kirk-Othmer Encyclopedia of Chemical Technology, Vol. 15, 3rd Edition, John Wiley and Sons, Inc., 1981.
2. Thies, C.: "Physicochemical Aspects of Microencapsulation," Polym. Plast. Technol. Eng., Vol. 5, 7 (1975).
3. Thies, C.: "Microencapsulation", McGraw-Hill Yearbook of Science and Technology, 1979, pp. 13-21.
4. Herbig, J. A.: "Microencapsulation", Encyclopedia of Polymer Science and Technology, Vol. 8, 719 (1968).

The microcapsules contain a temperature stabilizing means or phase change material such as eicosane. Additionally, plastic crystals such as 2,2-dimethyl-1,3-propanediol (DMP) and 2-hydroxymethyl-2-methyl-1,3-propanediol (HMP) and the like may be used as the temperature stabilizing means. When plastic crystals absorb thermal energy, the molecular structure is temporarily modified without changing the phase of the material. In another aspect of the invention, the composition of the phase change material may be modified to obtain optimum thermal properties for a given temperature range. For example, the melting point of a homologous series of paraffinic hydrocarbons is directly related to the number of carbon atoms as shown in the following table:

| Compound Name | Number of Carbon Atoms | Melting Point Degrees Centigrade |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Each of the above materials can be separately encapsulated and is most effective near the melting point indicated. It will be seen from the foregoing that the effective temperature range of the fiber can, therefore, be tailored to a specific environment by selecting the phase change materials required for the corresponding temperature and adding microcapsules containing the material to the fiber.

In addition, the fiber can be designed to have enhanced thermal characteristics over a wide range of temperature or at discrete temperature ranges through proper selection of phase change material.

In fabricating the fiber, the desired microencapsulated phase change materials are added to the liquid polymer, polymer solution, or base material and the fiber is then expanded according to conventional methods such as dry or wet spinning of polymer solutions and extrusion of polymer melts. Embedding the microcapsules directly within the fiber adds durability as the phase change material is protected by a dual wall, the first being the wall of the microcapsule and the second being the surrounding fiber itself. Thus, the phase change material is less likely to leak from the fiber during its liquid phase, thus enhancing its life and repeatability of thermal response.

In another important aspect of the invention, a fabric can be formed from the fibers described above by conventional weaving, knitting or nonwoven methods. For example, in a woven fabric any combination of the warp and weft with or without microcapsules can be used in order to obtain the desired texture and durability. This fabric may then be used to fabricate temperature adaptable clothing and other thermal barriers. For example, protective gloves can be made from the fabric. By choosing an appropriate phase change material, the gloves can be adapted for cold weather use. The gloves can be placed in a heating chamber prior to use to liquify the phase change material. When it is desired to use the gloves, they are removed from the chamber and they will remain warm for an extended period of time. Substantial cooling will not occur until the liquid phase change material has solidified. Conversely, by selecting the appropriate phase change material, the gloves can be used to handle hot objects. In this situation the glooves are cooled and a phase change material is solidified. When the gloves are exposed to a hot surface, the user will remain comfortable as he will perceive that they are remaining cool. This continues until the phase change material has liquified. The reader will note that this concept can be applied to numerous applications including items of clothing such as shoes, environmental suits as well as other applications which require shielding of individuals or machinery from the hot and cold.

The foregoing embodiments and examples are to be considered illustrative, rather than restrictive of the invention, and those modifications which come within the meaning and range of equivalence of the claims are to be included therein.

That which is claimed is:

1. A fiber with reversible thermal storage properties comprising:
    a base material, and
    a plurality of microcapsules integral with and dispersed throughout said base material, said microcapsules containing a temperature stabilizing means whereby the fiber exhibits enhanced thermal stability when subjected to heat or cold.

2. A fiber with reversible thermal storage properties according to claim 1 wherein said microcapsules are leak resistant, whereby the fiber may be subjected to repeated external mechanical stresses with minimum changes in the thermal characteristics of the fiber.

3. A fiber with reversible thermal storage properties according to claim 1 wherein said temperature stabilizing means comprises a phase change material.

4. A fiber with reversible thermal storage properties according to claim 1 wherein said temperature stabilizing means comprises a material selected from the group of paraffinic hydrocarbons.

5. A fiber with reversible thermal storage properties according to claim 1 wherein said temperature stabilizing means comprises a plastic crystal.

6. A fiber with reversible thermal storage properties according to claim 1 wherein said microcapsules range in diameter from about 1.0 micron to about 10 microns.

7. A fiber with reversible thermal storage properties according to claim 1 wherein the fiber includes at least two types of separately encapsulated temperature stabilizing means.

8. A fiber with reversible thermal storage properties comprising:
a synthetic polymer base material, and a plurality of leak resistant microcapsules integral with and dispersed throughout said synthetic polymer base material, said microcapsules containing a paraffinic hydrocarbon and ranging in diameter from about 1.0 micron to 10.0 microns.

9. A fabric with reversible thermal storage properties comprising:
a plurality of fibers and a plurality of microcapsules integral with and dispersed throughout the base material forming at least some of said fibers, said microcapsules containing a temperature stabilizing means, whereby the fibers form a fabric that exhibits enhanced thermal stability when subjected to heat or cold.

10. A fabric with reversible thermal storage properties according to claim 9 wherein said microcapsules are leak resistant, whereby the fabric may be subjected to repeated external mechanical stresses with minimum changes in the thermal characteristics of the fabric.

11. A fabric with reversible thermal storage properties according to claim 9 wherein said temperature stabilizing means comprises a phase change material.

12. A fabric with reversible thermal storage properties according to claim 9 wherein said temperature stabilizing means comprises a material selected from the group of paraffinic hydrocarbons.

13. A fabric with reversible thermal storage properties according to claim 9 wherein said microcapsules range in diameter from about 1.0 microns to about 10 microns.

14. A fabric with reversible thermal storage properties according to claim 9 wherein said fibers include at least two types of separately encapsulated temperature stabilizing means whereby the fabric exhibits enhanced thermal properties over a predetermined temperature range.

15. A fabric with reversible thermal storage properties according to claim 9 wherein said temperature stabilizing means comprises a plastic crystal material.

* * * * *